United States Patent [19]

Johnson

[11] Patent Number: 4,510,704
[45] Date of Patent: Apr. 16, 1985

[54] BOOT OR SHOE INCORPORATING PEDOMETER OR THE LIKE

[76] Inventor: William N. Johnson, Barnet House, Totteridge, London N.20, England

[21] Appl. No.: 451,166

[22] PCT Filed: Apr. 23, 1982

[86] PCT No.: PCT/GB82/00119
   § 371 Date: Dec. 2, 1982
   § 102(e) Date: Dec. 2, 1982

[87] PCT Pub. No.: WO82/03753
   PCT Pub. Date: Nov. 11, 1982

[30] Foreign Application Priority Data

Apr. 25, 1981 [GB] United Kingdom .................. 8112807
Sep. 28, 1981 [GB] United Kingdom .................. 8129212
Apr. 7, 1982 [GB] United Kingdom .................. 8210351

[51] Int. Cl.³ .......................... A43B 3/00; G01C 22/00
[52] U.S. Cl. ......................................... 36/136; 235/105
[58] Field of Search .................. 36/136, 1, 34 R; 235/105, 95 R

[56] References Cited

U.S. PATENT DOCUMENTS

| 542,107 | 7/1895 | Reinisch et al. ........................ 235/105 |
| 4,019,030 | 4/1977 | Tamiz ................................ 36/136 X |
| 4,175,446 | 11/1979 | Crowninshield et al. ....... 235/105 X |
| 4,220,996 | 9/1980 | Searcy ............................ 235/105 X |
| 4,371,945 | 2/1983 | Karr et al. ...................... 235/105 X |
| 4,402,147 | 9/1983 | Wu .................................... 36/136 |
| 4,466,204 | 8/1984 | Wu .................................... 36/136 |

FOREIGN PATENT DOCUMENTS 4438 12/1891 Switzerland ...................... 235/105

Primary Examiner—James Kee Chi
Attorney, Agent, or Firm—Pearne, Gordon, Sessions, McCoy, Granger & Tilberry

[57] ABSTRACT

A boot or shoe incorporating means (12) for detecting when a step is made, and means (5) for recording and displaying the total of the steps so recorded. The means (5) may be a mechanical counter and may be operated by a push button (11) mounted in the heel of the shoe. Alternatively the counter may be an electronic counter. In either case, the counter may be operated by an inertially operated mechanism. Where electronic counting means is used, the boot or shoe may incorporate a micro-processor and may be arranged to display, at will, such quantities as total number of steps made distance walked, means speed, etc., and may even be associated with pulse rate or blood pressure sensing means whereby these quantities may also be displayed.

8 Claims, 4 Drawing Figures

BOOT OR SHOE INCORPORATING PEDOMETER OR THE LIKE

TECHNICAL FIELD

This invention relates to boots and shoes.

BACKGROUND ART

Various forms of pedometer are known, but these are generally in the form of additional attachments to the wearer's person, and are therefore somewhat inconvenient and cumbersome.

DISCLOSURE OF INVENTION

It is a broad object of the invention, in one of its aspects, to provide an improved boot or shoe which will record, and provide an indication of, the number of steps made by the wearer of the shoes over a period or a value related to such number.

According to one aspect of the invention there is provided a boot or shoe incorporating means for detecting when a step is made, with the foot wearing the boot or shoe, by the wearer thereof, and means for recording and displaying a value related to the total of the steps so recorded.

Preferably there is also provided means for sensing and determining various other quantities, such as elapsed time, distance, speed or the like, and control means whereby the value of a selected said quantity can be displayed.

The boot or shoe preferably has a hollow heel which accommodates said detecting means and said recording and displaying means.

Preferably a display element afforded by said recording and displaying means is visible through a transparent window, which may be provided on the outer periphery of the heel of the boot or shoe, for example on the side surface which, when the boot or shoe is worn faces towards the wearer's other foot, or which may be provided in the insole of the boot or shoe so that the display element is visible when the shoe is removed from the wearer's foot.

It is an object of the invention in another of its aspects to provide an improved pedometer.

According to this aspect of the invention there is provided a pedometer incorporating step counting means arranged to provide an electrical signal for each step detected, and electrical circuitry embodying electronic counting and processing means for counting such signals, and electrical or electronic display means, operable by said counting and processing means, to display numerical quantities derived thereby, and user operable selection means operable to control the operation of said counting and processing means and the operation of the display means by the counting and processing means.

Preferably the pedometer includes electronic or electrical timing means connected with said counting and processing means, the counting and processing means being operable to record elapsed time as well as the number of signals received from said step detecting means, the counting and processing means being operable, by said selection means, to display optionally time or distance related data.

BRIEF DESCRIPTION OF DRAWINGS

Embodiments of the invention are described below with reference to the accompanying drawings in which.

BEST MODES OF CARRYING OUT THE INVENTION

Figure 1:
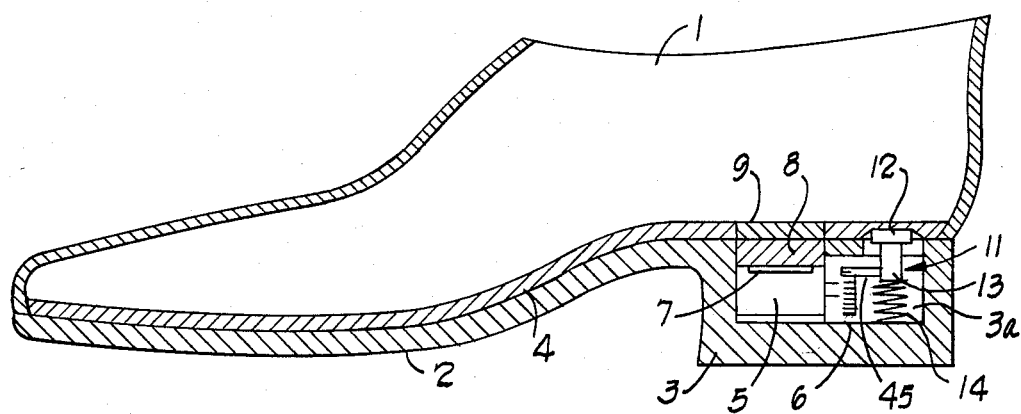
FIG. 1 is a diagrammatic sectional view of a shoe embodying the invention.

Referring to FIG. 1, a shoe has in conventional manner an upper 1, a sole 2, a heel 3 and an insole 4 extending the full length of the shoe.

The heel is provided with a cavity 3a in which is mounted a mechanical counter 5 having a ratchet wheel 6. The counter has a dial or drum arrangement 7 which displays the count. The heel 3 and insole 4 are provided with aligned windows 8 and 9, for example of transparent plastics material, through which the dial 7 is visible.

The counter is actuable by a push button 11 mounted within the cavity 3a for vertical reciprocating motion. The button 11 has a head 12 at its upper end and a shank 13 extending downwardly from head 12. A spring 14 biases the push button 11 upwardly so that when the wearer of the shoe is not exerting pressure on the heel of the shoe, by supporting, via the ground, any part of his weight through the heel 3, the head 12 occupies an upper position in which it engages the underside of the insole 4 and pushes the part of the insole which extends over the head 12 slightly upwardly.

When the wearer of the shoe places his weight on the heel, the button 11 is depressed, via the part of the insole extending over head 12, through a small distance. The shank 13 of the push button 11 has a projecting pawl 15 which engages with the ratchet wheel 6. Each time the push button is depressed, the pawl causes the ratchet wheel 6 to move through one pitch, and as a result the count displayed by the counter is advanced by one unit. Thus each time the wearer of the shoe takes a step, the push button is first pressed down by the wearer's heel and then released as the heel is lifted off the ground. The ratchet wheel consequently moves through one pitch at each step of the wearer by the foot wearing the shoe.

If desired, of course, since only alternate paces or steps will be made, by the wearer, with the foot wearing the shoe, the counter may be arranged to advance the count by two for every depression of the button 11.

Figure 2:
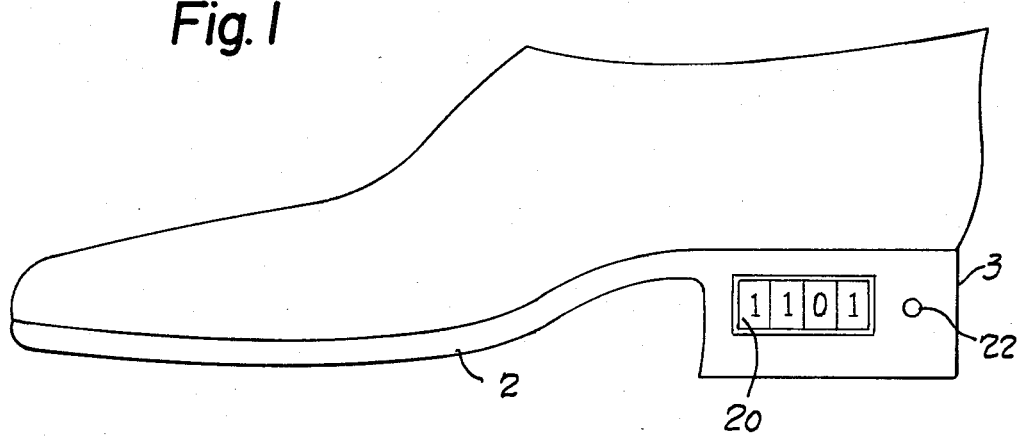
FIG. 2 is a side elevational view of a variant.

In a variant, the dial or display drum, or other display of the counter is visible through a transparent window 20 (see FIG. 2), provided in the external peripheral surface of the heel 3, preferably, as shown, in the lateral surface of the heel 3, which is on the inner side of the shoe, i.e. on the side which faces towards the other shoe when worn, (so that the shoe shown in FIG. 2 is a right shoe). Resetting means, such as a push-button 22, also disposed on the peripheral surface of the heel 3 may be provided for resetting the counter.

It will be appreciated that many variants of the invention are possible. Thus, for example, whereas, in the arrangement of FIG. 1, the counter is actuated by movement of the wearer's foot relative to the heel of the shoe, the counter may alternatively be actuated by movement, by engagement with the ground surface, of a part of the heel adapted to engage the ground surface, or of a distinct element, relative to the remainder of the shoe.

Furthermore, the counter may be operated by a mechanism similar to that utilised in a conventional pedometer, arranged to respond to inertial or gravitational forces, such as changes in movement of direction occurring during walking, or changes in the angle of the shoe relative to the horizontal.

While a mechanical counter has been described, it will be appreciated that the counter and/or the counter display and/or the means for sensing steps taken by the wearer may operate in some other way, for example, electrically or electronically. Thus, for example, the button 11 might be arranged to be operated by or might be replaced by a microswitch arranged to pass an impulse to an electrical or electronic counter every time a step is taken, or a pressure sensitive electronic transducer, for example utilising a piezo electric element or a strain gauge might be utilised or an inertially or gravitationally operated electrical device, such as a mercury switch might be used. The use of an electrical or electronic arrangement has, inter alia, the advantage that the sensing element, if sufficiently small, may be placed in the sole of the shoe and connected by wires to the circuitry disposed in the cavity in the heel.

Where electrical sensing means is utilised, a battery may be housed in the cavity 3a and counting may be effected by a monolithic counting integrated circuit also disposed within the heel cavity 3a and arranged to drive a LED or LCD digital display.

A boot or shoe as described, besides having a considerable novelty appeal for children and adults, for example enabling a child to readily count the number of steps taken in a certain exercise or game, is also of utility for atheletes or other persons undertaking a programme of exercise to improve or enhance physical fitness and which involves the counting of steps taken. Thus, a shoe for joggers may usefully incorporate a counter or pedometer as described above. A boot or shoe is described may also be used in the measurement of distance by pacing out, relying on a predetermined average length of step.

Whilst, in the embodiments described with reference to the drawings, in which the pedometer is fitted in the heel of a boot or shoe, it is convenient to have the pedometer operated by a switch or pressure sensitive element activated by the pressure of the wearer's heel against the sole of the shoe, as mentioned above, it is also possible, particularly where a pedometer utilizing an electrical or electronic counter is utilized, to use an inertially or gravitationally operated electrical device, such as a mercury switch, or to use an impulse or shock detector, e.g. incorporating a piezoelectric element to provide electrical impulses to be counted by an electrical or electronic counter.

Figure 3:
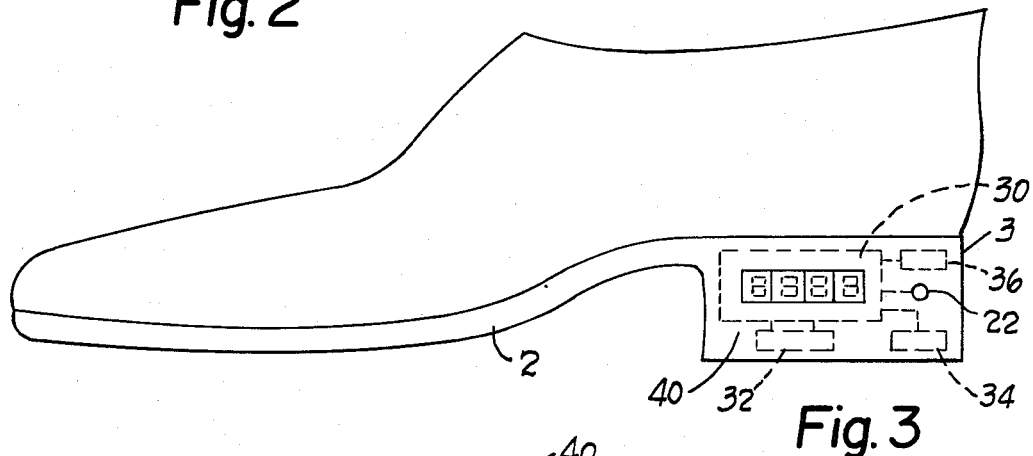
FIG. 3 is a side elevational view of a further variant incorporating a microprocessor.
Figure 4:
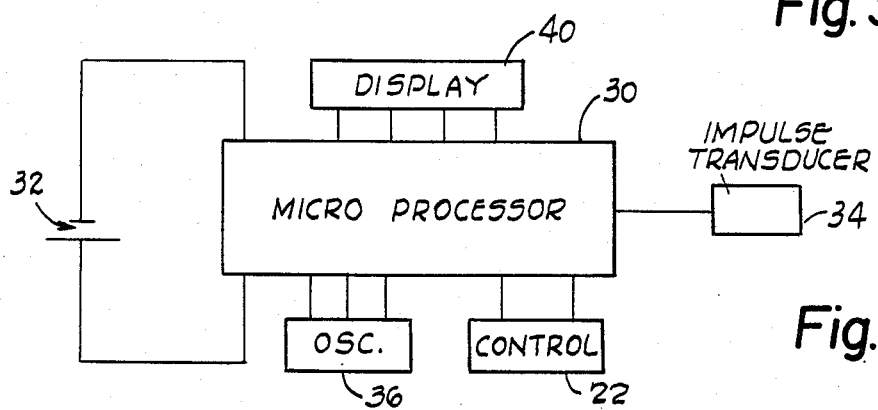
FIG. 4 is a block diagram of the pedometer incorporated in the embodiment of FIG. 3.

In an embodiment of the invention, illustrated in FIGS. 3 and 4, utilising electronic counting means, the pedometer incorporates, for example in the heel of the boot or shoe, electronic counting and processing circuitry, (preferably comprised in an integrated circuit or microchip (30, FIG. 3), for example in the form of a micro-processor), powered by a battery 32 (e.g. also incorporated in the heel of the boot or shoe) and connected with an impulse or shock transducer 34, for example incorporating a piezo electric element, timing means 36, for example incorporating, in manner known per se, a quartz crystal oscillator, also being connected with said circuitry and powered by the battery, the electronic counting and processing circuitry being also connected, with an electronic display element 40 such as a LED or LCD display, and with one or more control elements 22 such as push-buttons, knobs etc. for purposes of adjustment and mode selection, as set out below.

Whilst the electrical current requirement of the timing means and electronic counting and processing circuitry is preferably very low, so that it would be possible to maintain long intervals between battery replacement even if the circuitry were kept energised continuously, for purposes of energy conservation, it is preferable for the arrangement to be such that when the boot or shoe is not in use, at least some of the circuitry is effectively disconnected from the battery. In this case the arrangement may be such that when the boot or shoe is subjected to a shock or impulse, the electrical signal produced by the impulse transducer operates electronic switching means whereby the electronic counting and processing as a whole, and the timing means or the previously "disconnected" parts of the circuitry are energised from the battery and thereafter remain so energised provided that the time elapsed since the last impulse sensed by the impulse transducer is not greater than a predetermined value as set by the timing means. Such an arrangement is hereafter referred to as an automatic switch on/switch off arrangement.

The electronic counting and processing circuitry includes counters and dividers etc. associated with the timing means in a manner known per se from electronic watches and the like, and the arrangement is such that the timing means, in conjunction with the counting and processing circuitry and the display may, in one operating mode selected by the user by operation of the control means, be operated as a stop watch, whilst in another operating mode it may operate as a normal chronometer or clock (in which case, of course, it is necessary that the timing means and at least part of the circuitry should be energised continuously).

The electronic counting and processing circuitry preferably incorporates automatic resetting means which, in at least one selected mode of operation, resets at least some of the counters incorporated in the circuitry upon receipt of the first impulse from the impulse and shock transducer following a period greater than a predetermined period (which is preferably nevertheless substantially shorter than that determining operation of the automatic switch on/switch off arrangement), during which no impulses have been detected, so that the number of paces made and/or the time elapsed, since a period of running commenced can be recorded automatically. Similarly, the timing means in conjunction with the electronic counting and processing circuitry may be arranged to register the time elapsed at the instant of the last-detected impulse by the transducer so that, in effect, the "stop watch" can be stopped by the wearer simply by the latter remaining stationary for a period. If desired, operation of a manual control element, such as a push button on the side of the heel, may be required to displace from memory the time recorded after such a pause. Alternatively, the arrangement may be such that, after such a pause, upon the wearer starting to run again, i.e. upon the receipt of the next impulse from the transducer, the time previously recorded is transferred to another memory location so that whilst, at the end of the next period of running, the time for that period of running is displayed, the time for the previous period of running can be recalled by operation of a manual control.

The electronic counting and processing circuitry is preferably arranged to calculate, from the signals from the impulse transducer and the timing means and from a constant, corresponding to the wearer's length of pace, stored in the electronic counting and processing circuitry, the speed of the wearer. The value of this constant may be set previously by the wearer, the information being entered, for example, by operation of a push button, for example in much the same way as that in which known digital electronic watches are set, or by rotation of a knob or the like.

The processing means may be arranged to calculate, for example, average speed over a period of running or peak speed and to display the respective speed in miles per hour or kilometers per hour at choice, (made by operation of the control elements). The processing means, in conjunction with the timing means and impulse transducer, may be arranged to calculate other quantities, such as time spent walking over a larger predetermined time, e.g. over one day, total distance travelled, preferably displayable optionally in miles or kilometers, or the like. It will be appreciated, of course, that preferably the various functions such as time recorded, counting of paces, speed calculation etc. proceed simultaneously so that at any time the relevant data can be displayed in the display unit simply by operation of the control means appropriately.

Various memory storage locations may be provided in the processing means for other data, such as the number of steps made or distance covered in a previous period or the time elapsed, average speed, peak speed, etc. pertaining to a previous period of exercise, and any item of data selected from these may be caused to be displayed by the display by appropriate operation of the control element or elements.

Where the circuitry is normally arranged to carry out certain actions, such as automatic switch on/switch off, or automatic stop watch start/stop, preferably manually operable override controls are provided so that these functions may be placed under specific manual control.

It will be appreciated that, as for the case where a normal clock or chronometer function is to be provided, where it is desired to retain data in memory locations in the circuitry, it may be desirable to secure continuous electrical energisation of at least the respective parts of the circuitry.

However, where such functions are not required, the automatic switch on/switch off arrangement may apply to substantially the whole of the circuitry. Alternatively, of course, or in addition, a manually operable switch may be provided for control of circuit energisation.

It will be appreciated that a pedometer incorporating a micro-processor in the manner described, and relying upon a gravitationally or inertially operated switch or other sensor need not be incorporated in a boot or shoe but could be incorporated in an attachment adapted to be secured e.g. detachably, to the shoe for example to be detachably secured or clipped to the heel thereof, or to be fastened on top of the shoe by a strap extending around the instep or some similar arrangement. Alternatively the pedometer may be carried anywhere, for example on a strap or anklet carried around the wearer's ankle, or attached to the wearer's belt, or carried in a pocket or in some other way.

Furthermore, in a pedometer incorporating a micro-processor as proposed, further inputs to the micro-processor may be supplied by devices arranged, for example to sense the wearer's pulse rate, blood pressure, etc., with the micro-processor being arranged to correlate these quantities with the exercise taken, and such a device may clearly have important medical applications.

I claim:

1. A boot or shoe incorporating an electronic transducer for detecting when a step is made with the foot wearing the boot or shoe by the wearer thereof, said transducer being arranged to provide an electrical signal for each step detected, the boot or shoe further incorporating electrical circuitry embodying electronic counting and processing means for counting such signals, and electrical or electronic display means operable by said counting and processing means to display numerical quantities derived thereby, said display means including a display element visible from the exterior of the shoe through a transparent window, and user-operable selection means operable to control the operation of said counting and processing means and the operation of the display means by the counting and processing means, said electrical circuitry further including electronic or electrical timing means connected with said counting and processing means, the counting and processing means being operable to record elapsed time as well as the number of signals received from said step detecting means, the counting and processing means being operable by said user-operable selection means to cause said display means to display optionally time or distance-related data.

2. A boot or shoe according to claim 1, which has a hollow heel which accommodates said detecting means and said recording and displaying means.

3. A boot or shoe according to claim 1, wherein said transducer comprises an impulse transducer incorporating a piezo electric element.

4. A boot or shoe according to claim 1, wherein said counting and processing means is operable by said user-operable display means to cause said display means to display optionally one of at least two of the following quantities, namely: total number of steps made, distance traveled, speed, and time spent walking over a larger time.

5. A boot or shoe according to claim 1, in combination with means for sensing a physiological quantity such as pulse rate or blood pressure, and wherein said manually operable selection means is operable to cause said display element to display the respective quantity.

6. A boot or shoe according to claim 5, wherein said processing means is operable to correlate two or more of said quantities and wherein, by operation of said selection means, the result of such correlation may be caused to be displayed by said display element.

7. A boot or shoe according to claim 1, incorporating an electrical battery or cell and wherein said electrical circuitry includes means arranged in conjunction with said step detecting and said timing means to effectively disconnect at least some of said electrical circuitry from said battery or cell after a predetermined time has elapsed since the last signal received from the step detecting means, and to effectively reconnect the circuitry so disconnected when a signal is received from said step detecting means.

8. A boot or shoe according to claim 1, wherein said electrical circuitry includes set distance means whereby an adjustable set value representative of the distance covered per pace of the user may be presented to said counting and processing means and the counting and processing means is operable to compute the speed of the user from the signals from the step detecting means and from the data presented by the set distance means and the timing means.

* * * * *